(12) United States Patent
Larkin

(10) Patent No.: US 6,707,972 B1
(45) Date of Patent: Mar. 16, 2004

(54) OPTICAL MULTI-CONNECTOR TEST CABLE

(75) Inventor: Kevin B. Larkin, Scotts Valley, CA (US)

(73) Assignee: Westek Electronics, Inc., Santa Cruz, CA (US)

( * ) Notice: Subject to any disclaimer, the term of this patent is extended or adjusted under 35 U.S.C. 154(b) by 0 days.

(21) Appl. No.: 10/317,022

(22) Filed: Dec. 10, 2002

(51) Int. Cl.⁷ .................................................. G02B 6/44
(52) U.S. Cl. ...................................................... 385/106
(58) Field of Search ................................ 385/106, 105, 385/109, 147

(56) References Cited

U.S. PATENT DOCUMENTS

| | | | | |
|---|---|---|---|---|
| 5,231,687 A | * | 7/1993 | Handley | 385/139 |
| RE36,592 E | * | 2/2000 | Giebel et al. | 385/100 |
| 6,547,450 B2 | * | 4/2003 | Lampert | 385/78 |
| 2003/0002812 A1 | * | 1/2003 | Lampert | 385/78 |

* cited by examiner

Primary Examiner—Chandrika Prasad
(74) Attorney, Agent, or Firm—Lumen Intellectual Property Services, Inc.

(57) ABSTRACT

An optical test cable has a number of independent optical fibers bundled in a cable between two break out ends beyond which the individual fiber strings extend color coded with optical connectors installed on their ends. The optical connectors are covered with dust caps. During a measurement cycle, a technician may alternately use the independent fibers to couple a light-metering device to tested optical connectors. Providing a number of fibers allows the technician to change from one fiber to the next rather than having to polish the output face of the cable's optical connector at the testing site. The optical connectors at one end of the test cable are configured for attaching to the metering device. The optical connectors at the opposing end are either configured for attaching to a number of adapters or for direct attaching to varying standards the tested optical connectors.

3 Claims, 1 Drawing Sheet

OPTICAL MULTI-CONNECTOR TEST CABLE

FIELD OF INVENTION

The present invention relates to optical test cables.

BACKGROUND

Technicians that install fiber optics connectors must test each cable to warrant that they are performing correctly. The testing of the installed connectors is usually done with well-known light metering devices that are temporarily optically coupled to the tested connector via an optical test cable that is plugged with a first end into the metering device and with the opposing second end into the tested connector.

After optically coupling the metering device to the tested connector, the light transmission quality is measured by use of the metering device. After the transmission quality of the tested connector is determined, the test cable is again disconnected and the technician repeats the test cycle with another installed connector. In that fashion, usually a high number of installed connectors are tested at a test site and/or during a technician's shift.

To obtain accurate measurements for each test cycle it is crucial that the test cable provides consistent transmission quality throughout a high number of test cycles. Prior art optical test cables feature a single connector having a coupling face where the testing beam propagates through. The technician has to polish frequently the coupling face to assure that there is no dust or residue on the coupling face, which would degrade the test result. Polishing of the coupling face may consume significant time and may reduce significantly the number of test cycles a technician can perform during a given time period. Therefore, there exists a need for an optical test cable that eliminates the need for polishing the coupling face at the test site.

SUMMARY

An optical test cable is introduced, that combines a number of independent optical fibers in a single cable string. The fibers extend independently at both ends of the cable string. Each fiber has its own connectors on both ends. First connectors are equally configured for attaching to the metering device. Second connectors on the opposing end of the test cable are configured for attaching to tested connectors.

The independently extending fibers are color coded so that the technician may easily identify the two ends of a single fiber. Each connector features a dust cap that protects the coupling face while the connector is not in use.

During the testing of a number of installed connectors, the technician may subsequently use each optical fiber for a number of test cycles. Rather than polishing the coupling faces, the technician uses another fiber. In addition, the technician is able to verify a measurement with an alternate fiber. Once the technician has completed the required test cycles, all connectors may be polished at once.

In a first embodiment, the second connectors are also equally configured. A number of adapters are provided that correspond with one side to the second connectors' configuration. The adapters' opposing sides correspond to varying standards of the tested optical connector as they are well-known in the art. During a test cycle, a second connector is coupled to a tested connector via an matching adapter.

In a second embodiment, the second connectors are varyingly configured and correspond directly to the varying standards of the tested optical connector.

DETAILED DESCRIPTION

Figure 1:
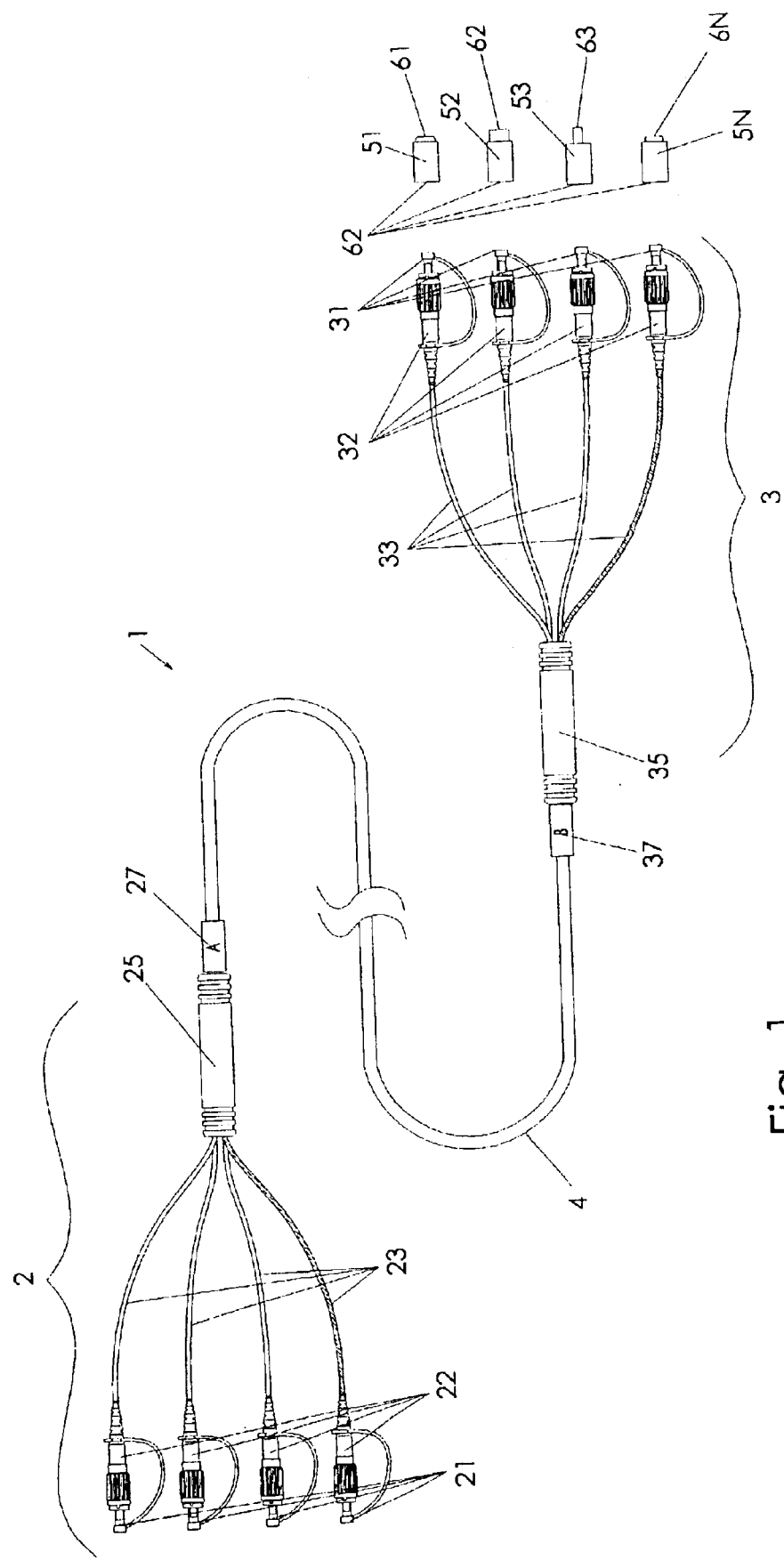
FIG. 1 shows an exemplary optical test cable together with a number of adapters.

Referring to FIG. 1, an exemplary optical test cable in accordance with the present invention is described in detail. Several details are depicted and described to give an understanding of the scope of the invention, which may be modified in many ways as is well understood by anybody skilled in the art.

An optical test cable 1 has a cable string 4, a first cable end 2 and a second cable end 3. The first cable end 2 includes a number of independent fibers 23 extending from the first break out 25. At the end of the independently extending fibers 23 are first connectors 22 installed. Dust caps 21 protect the first coupling faces of the first connectors 22. Coupling faces are the faces where beams are propagating through as is well-known by anybody skilled in the art. In FIG. 1, the first coupling faces are covered by the dust caps 21 and therefore not visible. The first connectors 22 are preferably equally configured for attaching to a light metering device as is well-known in the art. The first connectors 22 preferably conform but are not limited to the well-known FC standard.

The second cable end 3 includes a number of independent fibers 33 extending from the second break out 35. At the end of the independently extending fibers 33 are second connectors 32 installed. Dust caps 31 protect the second coupling faces of the second connectors 32. In FIG. 1, the second coupling faces are covered by the dust caps 31 and therefore not visible.

The first break out 25 and/or the second break out 35 may include optional labels 27, 37 for an easy identification of cable ends 2, 3.

In a first embodiment, the second connectors 32 are equally configured. A number of adapters 51–5N are provided that correspond with a first side 62 to the second connectors 32. The adapters' 51–5N opposing sides 61–6N correspond to varying standards of the tested optical connector is they are well-known in the art. Such standards include but are not limited to the well-known ST, FC, SC and LC standards. A connector 32 is coupled to a tested connected via one of the adapters 51–5N that matches the configuration of the tested connector. The second connectors 32 and the first sides 62 preferably conform but are not limited to the well-known FC standard.

In a second embodiment, the second connectors 32 have varying configurations that correspond directly to the varying standards of the tested optical connector. Such standards include but are not limited to the well-known ST, FC, SC and LC standards. A connector 32 is directly coupled to a tested connector.

The independently extending fibers 23, 33 are part of fiber strings that propagate independently inside the break outs 25, 35 and the flexible housing of the cable string 4. To identify the matching ends of a single fiber, the extending fibers 23, 33 are correspondingly color coded.

During testing of a number of tested connectors, the technician can easily identify the cable to start testing with. The metering result may eventually indicate that a coupling face has built up dust or residue. In that case, the technician just clips the dirty cable out of the way and goes on to pick another color cable and keep on testing until it is time again to move on to the next color, and so on. At the end of the work period, all the coupling faces may be polished at one time in preparation for the next number of test cycles.

The connectors 22, 32 are preferably male connectors that fit into a corresponding female connector at the metering device, the adapters 51–5N or the tested connectors. The scope of the invention includes embodiments where one or more of the connectors 22, 32 may be female connectors.

A optical test cable 1 may feature any number of independent fibers. Further, the exemplary depicted connectors 22 may have any configuration suitable for being connected to a metering device. Finally, the exemplary depicted connectors 32 may have any configuration suitable for being connected to a corresponding side 62 of adapters 51–5N and/or to tested connectors.

Accordingly, the scope of the invention described in the specification above is set forth by the following claims and their legal equivalent:

What is claimed is:

1. An optical test cable comprising:
    a. two or more independent fiber strings combined in a single cable string between a first break out and a second break out;
    b. a first cable end including:
        i. said first break out;
        ii. a number of first optical connectors installed at first ends of said fiber strings independently extending from said first break out, said first optical connectors being equally configured for alternately attaching to a light metering device;
        iii. a number of first dust caps removably covering a coupling face of said first connectors while said first connectors are not attached;
    c. a second cable end including:
        i. said second break out;
        ii. a number of second optical connectors being installed at second ends of said fiber strings independently extending from said second break out, said second optical connectors being configured for alternately attaching to a tested optical connector;
        iii. a number of second dust caps removably covering a coupling face of said second connectors while said second connectors are not attached; and
    wherein at least one of said first ends and at least one of said second ends of a single of said fiber strings are correspondingly coded for correspondingly identifying and attaching one of said first optical connectors and one of said second optical connectors such that said tested optical connector is optically coupled to said metering device via a single optical fiber.

2. The test cable of claim 1, wherein said second optical connectors having a number of configurations corresponding to varying standards of a number of said tested optical connector.

3. An optical test cable set comprising:
    a. a number of adapters each having:
        i. a first end uniquely configured in correspondence to varying standards of a number of tested optical connectors;
        ii. a second end equally configured; such that a matching adapter may be selected from said number of adapters for attaching to one of said number of tested optical connectors;
    b. a optical test cable having:
        i. two or more independent fiber strings combined in a single cable between a first break out and a second break out;
        ii. a first cable end including:
            1. said first break out;
            2. a number of first optical connectors installed at first ends of said fiber strings independently extending from said first break out, said first optical connectors being equally configured for alternately attaching to a light metering device;
            3. a number of first dust caps removably covering a coupling face of said first connectors while said first connectors are not attached;
        iii. a second cable end including:
            1. said second break out;
            2. a number of second optical connectors being installed at second ends of said fiber strings independently extending from said second break out, said second optical connectors being equally configured for alternately attaching to said second end of one of said adapters;
            3. a number of second dust caps removably covering a coupling face of said second connectors while said second connectors are not attached; and
    wherein at least one of said first ends and at least one of said second ends of a single of said fiber strings are correspondingly coded for correspondingly identifying and attaching one of said first optical connectors and one of said second optical connectors such that said one of said number of tested optical connectors is optically coupled to said metering device via one of said adapters and via a single optical fiber.

* * * * *